United States Patent [19]

Kassaw, Jr. et al.

[11] Patent Number: 5,221,510
[45] Date of Patent: Jun. 22, 1993

[54] METHOD FOR FORMING CURING ENVELOPE

[75] Inventors: Calvin M. Kassaw, Jr., Dardanelle; Jolanta K. Klimek, Havana, both of Ark.

[73] Assignee: Bridgestone/Firestone, Inc., Akron, Ohio

[21] Appl. No.: 823,178

[22] Filed: Jan. 21, 1992

[51] Int. Cl.⁵ ................ B29C 33/42; B29C 35/04
[52] U.S. Cl. .................... 264/501; 249/52; 264/572; 264/138; 264/293; 264/219; 264/326
[58] Field of Search ............ 249/52, 56; 264/138, 264/163, 325, 326, 501, 219, 293, 572; 425/17, 32, 292, 298, 299, 300; 156/95, 250, 252, 253, 268, 96; 29/428, 445, 525.1, 464

[56] References Cited

U.S. PATENT DOCUMENTS

| | | | |
|---|---|---|---|
| 1,310,441 | 7/1919 | Roberts | 264/325 |
| 1,576,184 | 3/1926 | Freeman | 264/163 |
| 3,752,726 | 8/1973 | Barefoot | 156/96 |
| 3,914,367 | 10/1975 | Himmelman | 264/326 |
| 4,036,271 | 7/1977 | Presti . | |
| 4,116,605 | 9/1978 | Burrell . | |
| 4,185,056 | 1/1980 | Detwiller . | |
| 4,197,064 | 4/1980 | MacMillan | 425/17 |
| 4,198,367 | 4/1980 | Burrell . | |
| 4,836,877 | 6/1989 | Perdue . | |
| 4,854,840 | 8/1989 | Hunter . | |
| 4,869,759 | 9/1989 | King et al. . | |
| 4,878,822 | 11/1989 | Wetch | 425/32 |
| 4,966,640 | 10/1990 | Hill . | |
| 4,992,035 | 2/1991 | Holroyd et al. | 425/32 |

Primary Examiner—Jan H. Silbaugh
Assistant Examiner—Mathieu Vargot
Attorney, Agent, or Firm—David A. Thomas

[57] ABSTRACT

An apparatus and method for forming curing envelopes which apparatus and method enable the use of a conventional inner tube mold for making a curing envelope perform in the form of an envelope tube which may have a portion thereof easily removed to provide a curing envelope suitable for use in a tire retreading process. A curing envelope is made by placing an annular tube of uncured envelope material in a curing mold having a center core and a mold insert installed therein. The insert includes a pair of coaxial annular rings projecting radially outwardly from the center core and connecting straps for maintaining the axial spacing between the rings. The mold is closed and heat and internal pressure are applied to the envelope tube for curing the envelope tube and urging the tube against the interior cavity surface with the annular rings penetrating into the inner wall of the tube for forming therein corresponding annular grooves. The mold is then opened and the envelope tube is removed from the mold after which the envelope tube is severed along the annular grooves to remove the portion of the inner wall of the envelope tube between the grooves thereby to form a curing envelope of generally U-shape cross-section.

16 Claims, 2 Drawing Sheets

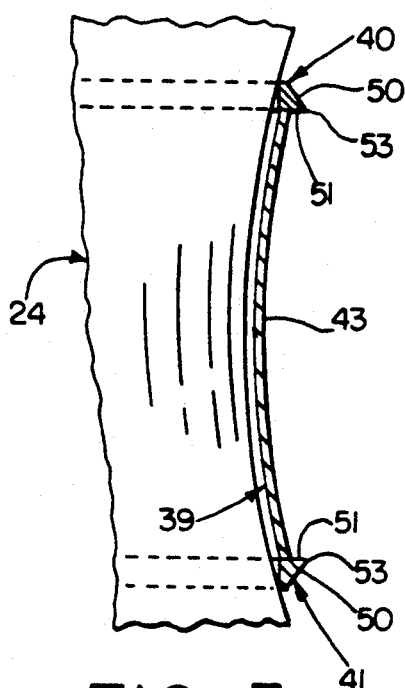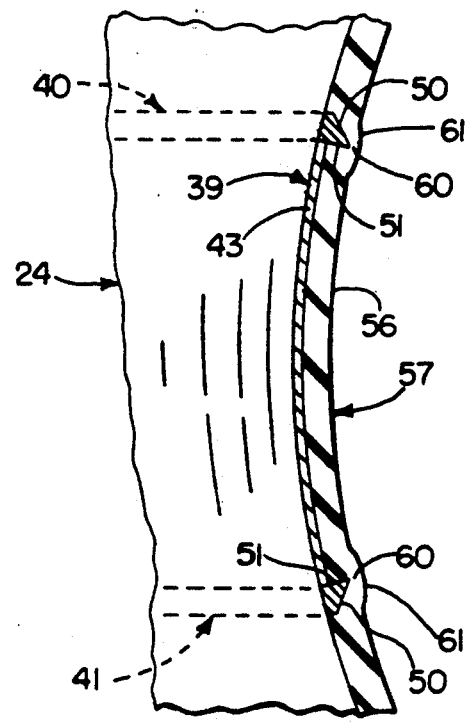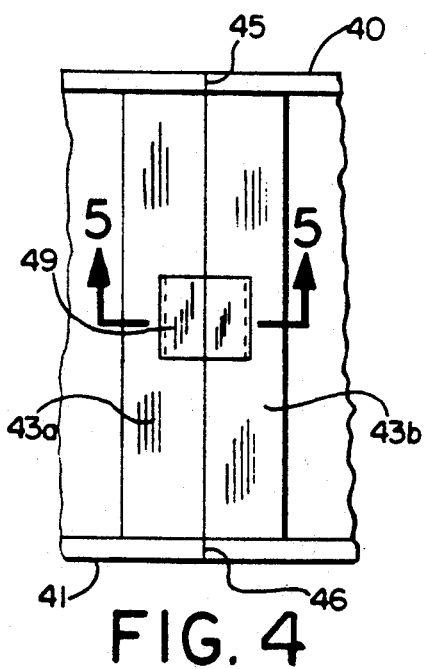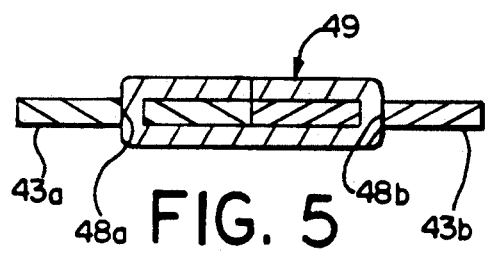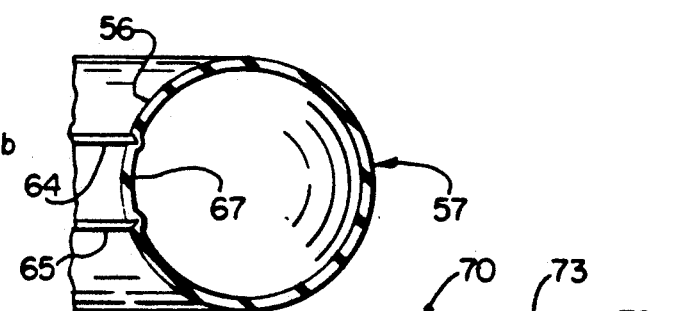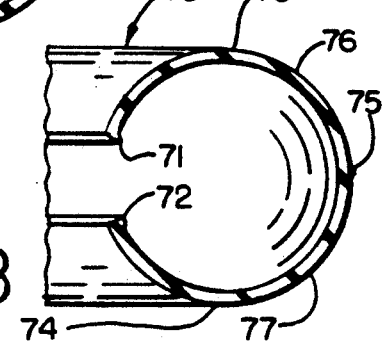

METHOD FOR FORMING CURING ENVELOPE

The invention herein described relates generally to the field of tire retreading or recapping and, more particularly, to the manufacture of a curing envelope used in a retreading process.

BACKGROUND

The retreading or recapping of tires with a pre-cured tread is a widely practiced art. Typically, a tire casing to be processed is prepared by grinding or buffing off any old tread remaining on the casing. In one process, cement is then applied and a layer of uncured cushion stock is applied to the cemented casing. An additional layer of cement is applied over the uncured cushion stock and a pre-cured tread layer is then applied over the cushion stock./ Finally, the entire composite uncured retread is inserted into a rubber curing envelope and the encased retread is then placed into a curing chamber or module, typically at a temperature of 200° to 325° F. and typically at a pressure of 50 to 150 pounds per square inch. The curing envelope functions as a protective covering of prevent air and/or steam used during the curing process from coming into contact with the element and uncured cushion stock during the curing process. A further function of the curing envelope is to compress the various components described above into tight engagement with the casing so that a suitable product is produced during the curing operation. Following the curing process, the encased retread is removed from the curing chamber and the curing envelope is removed to provide the finished retread.

A common practice has been to cure the green rubber curing envelopes in unique molds used solely for this purpose. An attendant disadvantage is the procurement cost of these special purpose molds. Presti U.S. Pat. No. 4,036,271 shows a press wherein a seamless curing envelope is compression formed from an uncured elastomeric slug.

In an effort to avoid the drawbacks and disadvantages of prior art techniques for producing curing envelopes, Perdue U.S. Pat. No. 4,836,877 proposes a process wherein an elastomeric material is extruded in substantially tubular form, with portions of the wall thickness of the circumference of the extruded tubing being of a thickness substantially greater than the wall thickness of the remainder of the tubing. A length of the extruded tubing is cut from the elongated tubing issuing from the extruded and a buttseamed to form an annular tube substantially of circular cross-section. The tube is then cured in a curing mold of the type used for curing conventional automobile or truck tubes, except that the cavity of the mold is given the cross-sectional shape corresponding to the desired cross-sectional shape of the curing envelope. The cured annular tube is then slit to open up the annular tube and, optionally, portions of the readily inner wall of the tube may be removed to provide a finished curing envelope of desired size.

SUMMARY OF THE INVENTION

The present invention provides an apparatus and method for forming curing envelopes which apparatus and method afford various advantages or, conversely, avoid various drawbacks and disadvantages of previously known techniques for producing curing envelopes. In particular, the invention provides an efficient, inexpensive method for making a curing envelope while eliminating the need for procurement of specialized molds. More specifically, the invention provides a mold insert for enabling the use of a conventional inner tube mold for making a curing envelope perform in the form of an envelope tube which may have a portion thereof easily removed to provide a curing envelope suitable for use in a tire retreading process.

Briefly stated, a curing envelope is made by placing an annular tube of uncured envelope material in a curing mold having a center core and a pair of coaxial rings projecting radially outwardly form the enter core. The mold is closed and heat and internal pressure are applied to the envelope tube for curing the envelope tube and urging the tube against the interior cavity surface with the rings penetrating into the inner wall of the tube for forming therein corresponding annular grooves. The mold is then opened and the envelope tube is removed form the mold after which the envelope tube is severed along the annular grooves to remove the portion of the inner wall of the envelope tube between the grooves thereby to form a curing envelope of generally U-shape cross-section.

In accordance with a preferred embodiment f the invention, the coaxial rings which project radially outwardly from the center core are provided by use of a mold insert which may be installed, for example, in a conventional inner tube mold thereby to convert the conventional mold for use in forming a curing envelope. The mold insert comprises a pair of coaxial rings adapted to closely circumscribe the center core of the curing mold and means interconnecting the rings for maintaining the axial spacing therebetween when assembled into the mold about the center core. The interconnecting means preferably comprises a plurality of circumferentially spaced apart traps which are bowed to conform to the contour of the center core. The rings preferably are split so that they may be opened to allow assembly onto the center core of the curing mold. The rings may then be closed and locked around the center core.

The groove forming rings have annular cutting edges which become embedded in the inner wall of the envelope tube to a point preferably just short of penetrating the inner wall. Accordingly, these cutting edges of the rings form respective annular groves in the inner wall of the envelope tube. After curing is complete, the envelope tube (now an envelope pre-form) is removed from the mold and the section of the inner wall between the annular grooves is removed by slitting or tearing along the grooves thereby turning the tube into a curing envelope of generally U-shape cross-section.

The foregoing and other features of the invention are hereinafter fully described and particularly pointed btu in the clams, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 3 is an enlarged fragmentary portion of FIG. 1.

FIG. 4 is a fragmentary elevational view of the mold insert taken form the line 4—4 of FIG. 2.

FIG. 5 is an enlarged fragmentary sectional view of the mold insert taken substantially along the line 5—5 of FIG. 4.

FIG. 6 is a view similar to FIG. 3, but showing an envelope tuber being cured in the inner tube mold.

FIG. 7 is a fragmentary, diagrammatic cross-sectional view of an envelope tube made in the practice of the invention.

FIG. 8 is a fragmentary, diagrammatic cross-sectional view of a curing envelope made in accordance with the invention.

DETAILED DESCRIPTION

Figure 1:
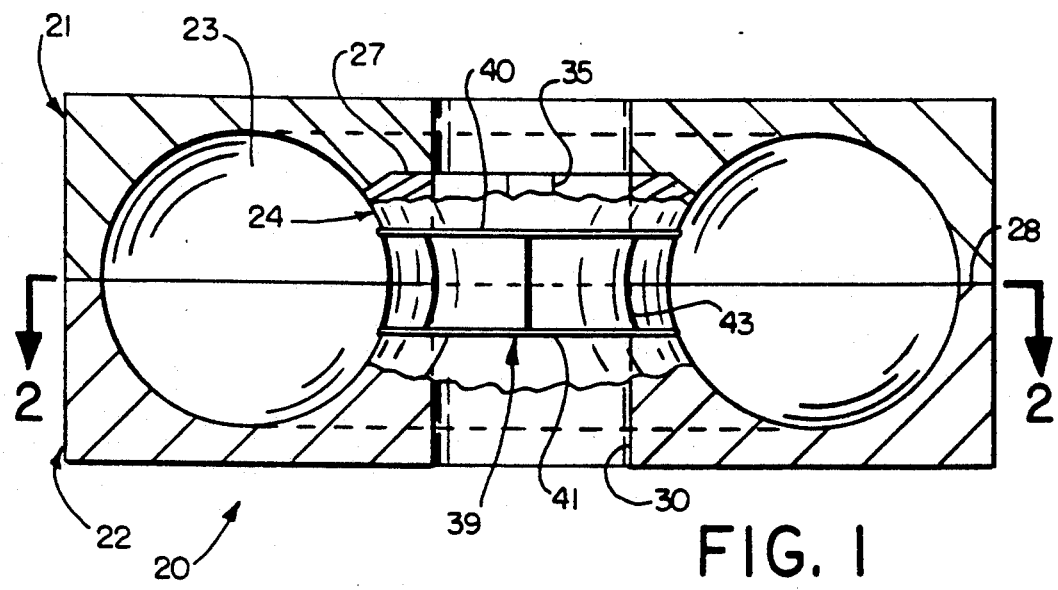
FIG. 1 is a diagrammatic sectional view, shown partly in elevation, of a conventional inner tube mold in closed position with a mold insert, according to the invention, installed therein.
Figure 2:
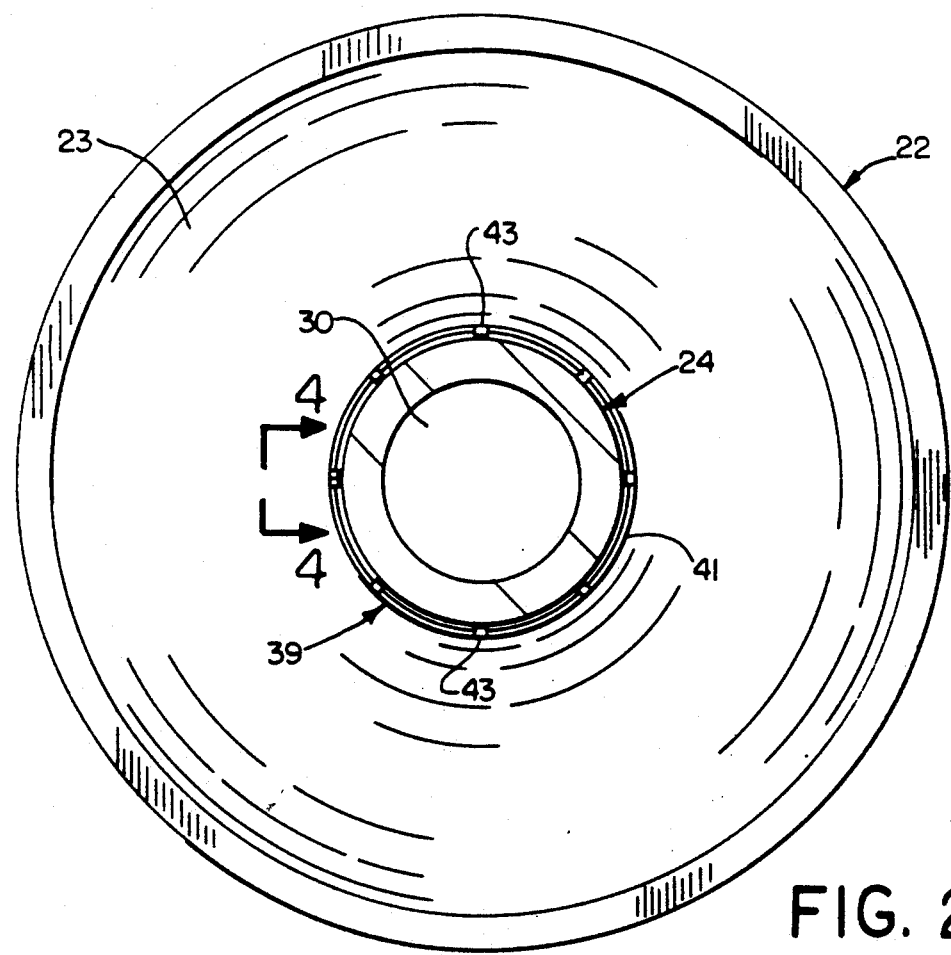
FIG. 2 is a diagrammatic sectional view of the inner tube mold of FIG. 1 taken substantially along the line 2—2 thereof.

Referring in detail to the drawings and initially to FIG. 1, a typical mold of the type for molding annular hollow articles and in particular for molding inner tubes is indicated generally at 20. The mold 20 generally comprises top and bottom mold halves or parts 21 and 22, one or both of which are movable by appropriate pressure actuated cylinders or other means (not shown) between open and closed positions, as is conventional. When the mold is closed as shown in FIG. 1, the top and bottom mold parts 21 and 22 form therebetween a doughnut-shape or annular mold cavity 23. The mold cavity 23 surrounds a center core 24, upper and lower portions of which are respectively formed by the top and bottom mold parts 21 and 22.

As is typical of molds used to mold inner tubes for use in pneumatic tires, the mold parting line 27 at the center core 24 is upwardly offset from the main parting line 28 of the mold 20, whereby the bottom mold part 22 forms a major portion of the inner core 24. Also the center core 24 has an anterior well 30 into which a conduit (not shown) may extend for delivery of pressurized and often heated fluid, such as steam, to the interior of an annular tube being cured in the mold. In accordance with conventional inner tube molding techniques, the pressurized heated fluid may be delivered into the interior of the annular tube being molded via a valve stem or the like which typically is received in a mold gate, the upper portion of which can be seen at 35 in FIG. 1. In the molding of inner tubes, the valve stem is usually bonded to the inner tube, although this is not of any consequence to the practice of the present invention, as curing envelopes are not normally provided with valve stems especially at the inner diameter portions thereof.

The mold 20 is converted for use in molding envelope types by installing therein a mold insert 39 according to the invention. The mold insert 39 comprises a pair of coaxial rings 40 and 41 adapted to closely circumscribe the center core 24 of the mold and means interconnecting the rings for maintaining the axial spacing therebetween when assembled into the mold about the center core. In the illustrated preferred embodiment, the interconnecting means comprises a plurality of cross ties in the form of connecting straps 43 which are attached at their top and bottom ends to the rings 40 and 41 and which are bowed or curved to conform to the contour of the center core. The connecting straps 43 are circumferentially spaced apart and preferably equally circumferentially spaced apart except for two end straps 43a and 43b. The end straps 43a and 43b are attached to the rings 40 and 41 at opposite sides of splits 45 and 46 in the rings. The rings are split at 45 and 46 so that they may be opened to allow assembly of the insert onto the center core of the mold. The rings have sufficient flexibility to permit separation of the ends thereof and hence opening of the rings to a size allowing the rings to be axially slipped over the center core and then closed around the center core.

When the rings 40 and 41 are closed around the center core 24, the end straps 43a and 43b are brought together with vertical edges thereof juxtaposed. As shown in FIGS. 4 and 5, the end straps are provided with respective axially extending slots 48a and 48b through which opposite ends of a locking band 49 may be passed to hold the ends straps 43a and 43b together. During installation, one end of the band 49 may be inserted through the slot in one of the end straps and bent back upon itself and against opposite side surfaces of the end strap. As the rings 40 and 41 are being closed around the center core 24 of the mold 2, the other end of the band 49 may be inserted through the slot in the other end strap and then pulled to draw the two end straps towards one another until the rings are tightened or cinched around the center core. At this point the pulled end of the band may be bent back upon itself to hold the end straps together. In this manner, the mold inset 39 is locked around and concentric with the center core. Also, the rings will be held quidistant from the transaxial center plane of the mold cavity coinciding with the main mold parting line 28 in the illustrated curing mold.

Although the ends of the rings 40 and 41 and the adjacent vertical edges of the straps 43a and 43b are shown in FIGS. 4 and 5 to be butted up against one another, preferably a small gap is provided between the ring ends and strap edges when the mold insert 39 is installed around the center core 24 at room temperature. The small gap is provided to accommodate the increase in circumferential length of the rings due to thermal expansion when subjected to molding temperatures. The small gap allows the rings to thermally expand without an increase in their diameter that would cause the rings to move away from and out of contact with the center core. Generally, a gap of about 1/32 inch (0.8 m) to about 1/16 inch (1.6 mm) is normally sufficient for mold inserts ranging in diameter form about 16 inches (41 cm) to about 25 inches (64 cm).

As seen in FIG. 3, each ring 40, 41 has axially outer and inner side surfaces 50 and 51 which extend away from the curved surface of the mold core and project into the mold cavity 23 beyond the connecting straps 43. The axially inner and outer surface 50 and 51 convert to a narrow edge or cutting point 53 with such sides forming, for example, an included angle of about 50° in the illustrated preferred embodiment of the invention.

For green envelope tubes having a nominal wall thickness of about 0.110 to 0.120 inch (2.8 to 3.0 mm), desirable results have been obtained by fabricating the rings 40 and 41 from 0.125 by 0.125 inch (3.2 by 3.2 mm) square medium grade steel bars. The bars are ground to yield the cutting edges illustrated in FIG. 3 and then are cut to length and bent to form the rings 40 and 41.

Further by way of specific example, in the illustrated embodiment there are seven intermediate connecting traps 43 and two end straps 43a and 43b. The seven intermediate straps may be about 0.04 inch (1 mm) thick and 0.25 inch (6.4 mm) wide, whereas the two end straps may be 0.04 inch (1 mm) thick and 0.5 inch (12.7 mm) wide. The straps may be made of mild steel and bent to a radius corresponding to the radius of the center core 24 of the mold 20, typical radii ranging from 4.25 inch (10.8 cm) to 7.445 inch (18.9 cm) for inner tube molds ranging in inner diameter from 16 to 25 inches (41 to 64 cm). The connecting straps may be brazed at their ends to the rings after having been cut to length to provide the desired axial spacing between the rings. The axial spacing between the rings will depend upon the desired bead-to-bead perimeter dimension of the finished curing envelope obtained by carrying out the method of the invention which will now be described in detail.

With the mold insert 39 installed in the mold 20 as aforedescribed, a green annular tube made from an envelope compound may be placed and cured in the mold. The green envelope tube may be fabricated utilizing conventional tubing, splicing and pre-forming processes and equipment theretofore used in the art to make inner tubes for pneumatic tires. Also, the green envelope tube may be cured in the mold using a conventional process for molding inner tubes, although processing parameters may be varied as needed for the particular envelope compound being used, such as a suitable rubber compound. The invention hereof may be used in conjunction with any envelope compound that lends itself to molding in an inner tube mold like that above-described. For the sake of brevity, the processes for barricading the green envelope tube and the specific details of operating the curing mold will not be described in detail as such processes are well known in the art. However, it is here noted that the mold parts are usually heated by passage of stem or other head media through passages in the mold parts or by electric heaters. Also, a pressurized fluid which may be heated is supplied to the interior of the green tube, such as through a valve stem held in the mold gate 35, to shape and heat the green tube, the pressurized fluid urging the green tube against the mold cavity surface.

When the green envelope tube is urged under pressure against the mold cavity surface, it can be seen in FIG. 6 that the inner wall 56 of the tube 57 will be urged into engagement with the mold insert 39. More particularly, the inner wall of the green envelope tube will engage the connecting straps 43 and will huge them towards and against the center core 24. Because the connecting straps are fixably attached to the rings 40 and 41, the during of the connecting traps towards and against the center core will cause each ring to rotate slightly about its point of contact between its axially outward inner edge and the center core. This rotation results form the illustrated preferred construction of the mold insert wherein the rings are readily fabricated from bars of rectangular and more particularly square cross-section. If desired, the radially inner sides of the rings may be contoured to correspond to the contour of the center core, whereby the rings will not be subjected to the aforedescribed rotation.

The urging of the green envelope tube 57 against the center core 24 will cause the rings 40 and 41 to become embedded in the inner wall 56 of the tube for forming therein corresponding annular grooves. Preferably, each ring is embedded into the inner wall of the tube to a point just short of penetrating the wall, leaving a thin annular web 60 of preferably about 0.020 inch (0.5 mm) thickness. It has been found that as the ring becomes embedded in the inner wall of the tube that some of the material of the tube wall will be displace inwardly to form a raised ridge 61. The bead has axially inner and outer portions thereto at opposite sides of the tindowned annular web portion 60 of the inner wall coinciding with the cutting point 53 of the insert ring.

After the envelope tube 57 has been sufficiently cured in the mold 20, the mold is opened and the envelope tube is removed therefrom. As illustrated in FIG. 7, the envelope tube will have formed therein a pair of exteriorly opening coaxial annular grooves 64 and 65 in the outer surface of the inner wall 56 of the envelope tube.

After the envelope tube 57 has been removed from the mold 20 and preferably after the tube has cooled to about room temperature, the section 67 of the inner wall 56 between the two grooves 64 and 65 is quickly and easily removed as by slitting the inner wall along the grooves and in particular, along its thinnest point, i.e., at the annular web 60 at the bottom of each groove. As will be appreciated, the grooves provide a convenient guide line for slitting the inner wall of the tube. Also the reduced thickness of the inner wall at the bottom of each groove greatly contributes to the ease at which the inner wall may be slit as by using a sharp knife, cutting blade or the like. The removed section 67 also is the area whereat the valve stem would typically be located. Hence, the valve stem, which provides for introduction of pressurized fluid into the interior of the envelope tube, will be removed along with the section 67. If the reduced thickness at the bottom of each groove is sufficiently thin, the section 67 may be removed by tearing as long the grooves especially when the curing envelope is still hot. Tearing may be facilitated by scoring the envelope at the bottom of each groove. In any event, the grooves provide a guide for and preferably facilitate separation of the section 67 from the remainder of the tube to form a curing envelope with well defined and precisely located peripheral edges.

Removal of the section 67 of the inner wall between the grooves 64 and 65 converts the envelope tube into a curing envelope indicated at 70 in FIG. 8. The resultant curing envelope 70 is generally U-shape in radial cross-section and has axially inwardly raised beads 71 and 72 disposed along the peripheral edges thereof. The raised beads 71 and 72 have been found to facilitate form of a tight seal between the peripheral edges of the envelope and respective sides of a composite uncured retread inserted therein during the retreading process. Contributing to the size and shape of these raised beads is the particular orientation of the converging side surfaces 50 and 51 of each ring 40, 41. Preferably, the axially inner side surface 51 of each ring will be substantially radially disposed in relation to the adjacent curved surface of the center core and more so than the axially outer surface 50, whereby more of the ridge material will be disposed on the axially outer side of the annular web portion 60 as best illustrated at the bottom of FIG. 6. consequently, more pronounced beads 71 and 72 would be formed along the peripheral edge of the curing envelope, as compared to when the axially inner side surface 50 is more radially disposed than the axially inner side surface 51.

As will be appreciated, different size mold inserts and/or mold cavities may be used to make different sizes of curing envelopes for use with different sizes of tires and/or retreading equipment. For a given size of mold cavity, the edge-to-edge or bead-to-bead dimension of the curing envelope (measured along the inside periphery of the envelope in radial cross-section) may be varied by changing the axial spacing between the rings 40 and 41 of the mold insert. Increasing the axial spacing between the rings 40 and 41 of the mold inset.

Increasing the axial spacing between the rings will decrease the bead-to-bead dimension whereas decreasing the axial spacing will increase the bead-to-bead dimension. Accordingly, a single mold may be used to make several different sizes of curing envelopes simply by installing therein different sizes of mold inserts. Different sizes of mold cavities may also be used to provide different sizes of curing envelopes.

With reference to FIG. 8, the curing envelope 70 may be viewed as having side walls 73 and 74 and a base 75 extending between and joining the side walls. When a composite uncured retread is inserted into the curing envelope, the side walls 73 and 74 willing early overlie the side walls of the retread and the base will generally overlie the tread of the retread. For increased durability of the curing envelope the annular edge regions 76 and 77 thereof, where the side walls join the base may be of increased thickness. For example, the green envelope tube may be formed with the annular edge regions (or the entire crown) thereof having a gauge thickness about 5-15% thicker than the nominal gauge thickness of the tube.

Although the invention has been described and shown with respect to a preferred embodiment, alternations and modifications will no doubt occur to others skilled in the art upon the reading and understanding of this specification. For example, the insert ring may be interconnected by means other than the connecting straps, such as by a continuous web joined to or formed integrally with the rings. As a further exemplary alternative, the rings may be fixed as bey welding to the center core of the mold or fitted in respective grooves formed in the center core, in which case the enter core would function as interconnecting means for the rings. This, however, would be less desirable because of the limitations that would be placed on use of the mold for different size curing envelopes. If desired, the insert rings may be formed by annular ribs or beads integrally formed on the center core of the mold by machining, although it is less desirable than a removable and interchangeable mold insert. Another alternative approach would be to use segmented rings installed in a curing mold. Regarding the mold, the invention may be practiced with molds other than conventional inner tube molds and even in curing molds specially designed to make curing envelopes that may be given specific profile other than that obtained by use of a conventional inner tube mold. The present invention includes these various alterations and modifications and is limited only by the scope of the following claims.

What is claimed:

1. A method for making a curing envelope comprising the steps of:
   placing a green envelope tube in a cavity in a curing mold having a center core and a pair of coaxial rings projecting form the center core;
   closing the mold and applying heat and internal pressure to the green envelope tube for curing the envelope tube and urging the tube against the interior cavity surface with the rings penetrating into the inner wall of the tube for forming therein corresponding annular grooves;
   opening the mold and removing the envelope tube from the mold; and
   severing the envelope tube along the annular grooves to remove the portion of the inner wall of the envelope tube between the grooves thereby to form a curing envelope of generally U-shape radial cross-section.

2. A method as set forth in claim 1, including the step of assembling the rings around the center core of the curing mold equidistant from the transaxial center plane of the mold cavity.

3. A method as set froth in claim 1, including the step of changing the axial spacing between the rings to provide curing envelopes having different edge-to-edge dimensions.

4. A method as set forth in claim 1, including the step of installing a mold insert in the curing mold around the center core, the mold insert including the rings which closely circumscribe the center core.

5. A method as set forth in claim 4, including the step of interchanging mold inserts having different axial spacings between the rings thereof for making curing envelopes having different edge-to-edge dimensions.

6. A method as set forth in claim 1, including the step of assembling the rings around the center core by separating split ends of the rings to open the rings to allow assembly over the center core and then bringing the ends of the rings together to close the rings around the center core.

7. A method as set forth in claim 6, including the step of leaving a gap between the ends of the rings when assembled around the center core to accommodate an increase in circumferential length of the rings when heated during the curing of the envelope tube.

8. A method as set forth in claim 1, wherein the rings are caused to penetrate at least about half way through the inner wall of the tubes thereby to provide a narrow reduced thickness web portion at the bottom of each groove.

9. A method as set forth in claim 8, wherein the rings function to displace some of the material of the inner wall to form raised annular ridges opposite the annular grooves, and said severing step includes severing the envelope tube along the annular grooves while leaving a portion of the raised annular ridges which form inwardly raised beads disposed along the peripheral edges of the curing envelope.

10. A method for making a curing envelope in mold the mold including upper and lower mold pats forming therebetween an annular mold cavity of circular radial cross-section surrounding a center core the upper and lower mold parts being relatively movable to open and close the mold, and the center core having upper and lower portions; said method comprising the steps of:
   installing a mold insert in the mold around the lower portion of the center core, the mold insert including a pair of rings that are interconnected at a fixed axial spacing in the mold insert, the mold insert being installed such that the rings closely circumscribe the lower portion of the center core;
   placing a green envelope tube around the lower portion of the center core;
   closing the mold and applying that and internal pressure of the green envelope tube for curing the envelope tube and urging the tube against the interior cavity surface with the rings penetrating into the inner wall of the tube for forming therein corresponding annular grooves;
   opening the mold and removing the envelope tube from the mold; and
   severing the envelope tube along the annular grooves to remove the portion of the inner wall of the envelope tube between the grooves thereby to form a curing envelope of generally U-shape radial cross-section.

11. A method as st forth in claim 10, including the step of replacing the mold inset with a different mold inset having a different axial spacing between the rings thereof for making a curing envelope having a different edge-to-edge dimension.

12. A method as set forth in claim 10,. wherein the rings are caused to penetrate at least about half way through the inner wall of the tube thereby to provide a narrow reduced thickness web portion at the bottom of each groove.

13. A method as set forth in claim 10, wherein the rings function to displace some of the material of the inner wall to form raised annular ridges opposite the annular grooves, and said severing step includes severing the envelope tube along the annular grooves while leaving a portion of the raised annular ridges which form inwardly raised beads disposed along the peripheral edges of the curing envelope.

14. A method as set forth in claim 10, wherein the mold inset is split to form separable ends, and the step of installing the mold insert includes separating the separable ends to expand the mold insert for fitting over the lower portion of the center core during installation, drawing the separable ends towards one another to close the mold inset around the lower portion of the center core, and using a mechanical device to secure the separable ends together thereby to lock the mold insert to the lower portion of the center core.

15. A method as set forth in claim 10, wherein said step of installing the mold inset includes using a mold inset wherein the rings are interconnected by a plurality of circumferentially spaced part cross ties attached top and bottom to the coaxial rings, the cross ties being curved to conform to the contour of the center core.

16. A method as set forth in claim 10, wherein said step of installing the mold insert includes using a mold insert wherein the rings each have axially inner and outer side surfaces which converge to form a narrow outer edge.

* * * * *